US012786740B2

(12) United States Patent
Yapici et al.

(10) Patent No.: US 12,786,740 B2
(45) Date of Patent: Nov. 3, 2026

(54) PATTERN SELECTION FOR ARRAY PUNCTURING

(71) Applicant: QUALCOMM Incorporated, San Diego, CA (US)

(72) Inventors: Yavuz Yapici, Florham Park, NJ (US); Igor Gutman, Hod HaSharon (IL); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 18/520,252

(22) Filed: Nov. 27, 2023

(65) Prior Publication Data

US 2025/0175812 A1 May 29, 2025

(51) Int. Cl.

*H04W 16/28* (2009.01)
*H04B 17/318* (2015.01)
*H04L 5/00* (2006.01)
*H04W 72/0446* (2023.01)

(52) U.S. Cl.

CPC .......... *H04W 16/28* (2013.01); *H04B 17/328* (2023.05); *H04L 5/0051* (2013.01); *H04W 72/0446* (2013.01)

(58) Field of Classification Search

CPC ..... H04W 16/28; H04W 12/12; H04W 52/02; H04W 52/14; H04W 52/24; H04W 72/04; H04W 72/08; H04W 72/12; H04W 72/24; H04W 72/25; H04W 76/20; H04W 76/30; H04W 74/08; H04W 64/00; H04L 5/00; H04L 5/14; H04L 1/00; H04L 1/16; H04L 25/02; H04L 27/26

USPC .......................................................... 370/329

See application file for complete search history.

(56) References Cited

U.S. PATENT DOCUMENTS 7,751,381 B2 * 7/2010 Kuwahara ............. H04W 16/28 370/342
10,595,271 B2 * 3/2020 Jung ................. H04W 52/0216
10,841,914 B2 * 11/2020 Liou ..................... H04L 5/0094
11,405,877 B2 * 8/2022 Bengtsson .......... H04W 56/001
11,451,277 B2 * 9/2022 Eleftheriadis ........ H04B 7/0617
11,522,588 B1 * 12/2022 Jiang .................... H04B 7/0695
12,074,667 B2 * 8/2024 Elhadeedy ........... H04B 17/309
12,395,971 B2 * 8/2025 Xu ...................... H04W 72/232
12,506,523 B2 * 12/2025 Marupaduga ........ H04B 7/0617
2021/0184372 A1 * 6/2021 Schwartz ................. H01Q 3/22
2023/0189315 A1 * 6/2023 Haustein ............... H04W 24/02 370/252
2025/0039805 A1 * 1/2025 Eder .................... H04B 7/0617
2025/0266894 A1 * 8/2025 Yapici .................. H04B 7/0617

* cited by examiner

*Primary Examiner* — Man U Phan
(74) *Attorney, Agent, or Firm* — Polsinelli LLP

(57) ABSTRACT

Disclosed are systems and techniques for wireless communications. For instance, a process may include obtaining a message for transmission to a second apparatus; determining a time slot of a set of time slots for transmitting the message; determining a symbol of the time slot; determining a number of antenna elements of the first apparatus to disable; transmitting a beamformed transmission including a portion of the message for transmission towards the second apparatus; and disabling the number of antenna elements during the symbol of the time slot when transmitting the beamformed transmission in a direction other than towards the second apparatus.

30 Claims, 11 Drawing Sheets

PATTERN SELECTION FOR ARRAY PUNCTURING

FIELD

The present disclosure generally relates to wireless communications. For example, aspects of the present disclosure relate to systems and techniques for providing pattern selection for array puncturing in wireless systems such as wireless communication systems.

BACKGROUND

Wireless communications systems are deployed to provide various telecommunications and data services, including telephony, video, data, messaging, and broadcasts. Broadband wireless communications systems have developed through various generations, including a first-generation analog wireless phone service (1G), a second-generation (2G) digital wireless phone service (including interim 2.5G networks), a third-generation (3G) high speed data, Internet-capable wireless device, and a fourth-generation (4G) service (e.g., Long-Term Evolution (LTE), WiMax). Examples of wireless communications systems include code division multiple access (CDMA) systems, time division multiple access (TDMA) systems, frequency division multiple access (FDMA) systems, orthogonal frequency division multiple access (OFDMA) systems, Global System for Mobile communication (GSM) systems, etc. Other wireless communications technologies include 802.11 Wi-Fi, Bluetooth, among others.

A fifth-generation (5G) mobile standard calls for higher data transfer speeds, greater number of connections, and better coverage, among other improvements. The 5G standard (also referred to as "New Radio" or "NR"), according to Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments.

Although wireless communication systems have made great technological advancements over many years, challenges still exist. For example, certain transmissions from a wireless system may need to be made without cryptographic protection (encryption) to protect against potential eavesdropping, replay attacks, etc. Thus, techniques to help protect such messages against eavesdropping may be useful.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Disclosed are systems, methods, apparatuses, and computer-readable media for performing wireless communications. In one illustrative example, an apparatus for wireless communications is provided. The apparatus includes a memory system and a processor system coupled to the memory system. The processor system is configured to: obtain a message for transmission to a second apparatus; determine a time slot of a set of time slots for transmitting the message; determine a symbol of the time slot; determine a number of antenna elements of the first apparatus to disable; transmit a beamformed transmission including a portion of the message for transmission towards the second apparatus; and disable the number of antenna elements during the symbol of the time slot when transmitting the beamformed transmission in a direction other than towards the second apparatus.

As another example, a method for wireless communications by a first apparatus is provided. The method includes: obtaining a message for transmission to a second apparatus; determining a time slot of a set of time slots for transmitting the message; determining a symbol of the time slot; determining a number of antenna elements of the first apparatus to disable; transmitting a beamformed transmission including a portion of the message for transmission towards the second apparatus; and disabling the number of antenna elements during the symbol of the time slot when transmitting the beamformed transmission in a direction other than towards the second apparatus.

In another example, a non-transitory computer-readable medium having stored thereon instructions is provided. The instructions, when executed by a processor system, cause the processor system to: obtain a message for transmission to a second apparatus; determine a time slot of a set of time slots for transmitting the message; determine a symbol of the time slot; determine a number of antenna elements of a first apparatus to disable; transmit a beamformed transmission including a portion of the message for transmission towards the second apparatus; and disable the number of antenna elements during the symbol of the time slot when transmitting the beamformed transmission in a direction other than towards the second apparatus.

As another example, an apparatus for wireless communications is provided. The apparatus includes: means for obtaining a message for transmission to a second apparatus; means for determining a time slot of a set of time slots for transmitting the message; means for determining a symbol of the time slot; means for determining a number of antenna elements of the first apparatus to disable; means for transmitting a beamformed transmission including a portion of the message for transmission towards the second apparatus; and means for disabling the number of antenna elements during the symbol of the time slot when transmitting the beamformed transmission in a direction other than towards the second apparatus.

In some aspects, one or more of the apparatuses described herein is, is a part of, or includes a mobile device (e.g., a mobile telephone or so-called "smart phone", a tablet computer, or other type of mobile device), a wearable device, an extended reality device (e.g., a virtual reality (VR) device, an augmented reality (AR) device, or a mixed reality (MR) device), a personal computer, a laptop computer, a video server, a television (e.g., a network-connected television), a vehicle (or a computing device or system of a vehicle), or other device. In some aspects, the apparatus includes at least one camera for capturing one or more images or video frames. For example, the apparatus can include a camera (e.g., an RGB camera) or multiple cameras for capturing one or more images and/or one or more videos including video frames. In some aspects, the apparatus includes a display for displaying one or more images, videos, notifications, or other displayable data. In some aspects, the apparatus includes a transmitter configured to transmit one or more video frame and/or syntax data over a transmission medium to at least one device. In some aspects, the processor includes a neural processing unit (NPU), a central processing unit (CPU), a graphics processing unit (GPU), or other processing device or component.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description.

BRIEF DESCRIPTION OF THE DRAWINGS

Examples of various implementations are described in detail below with reference to the following figures.

DETAILED DESCRIPTION

Figure 1:
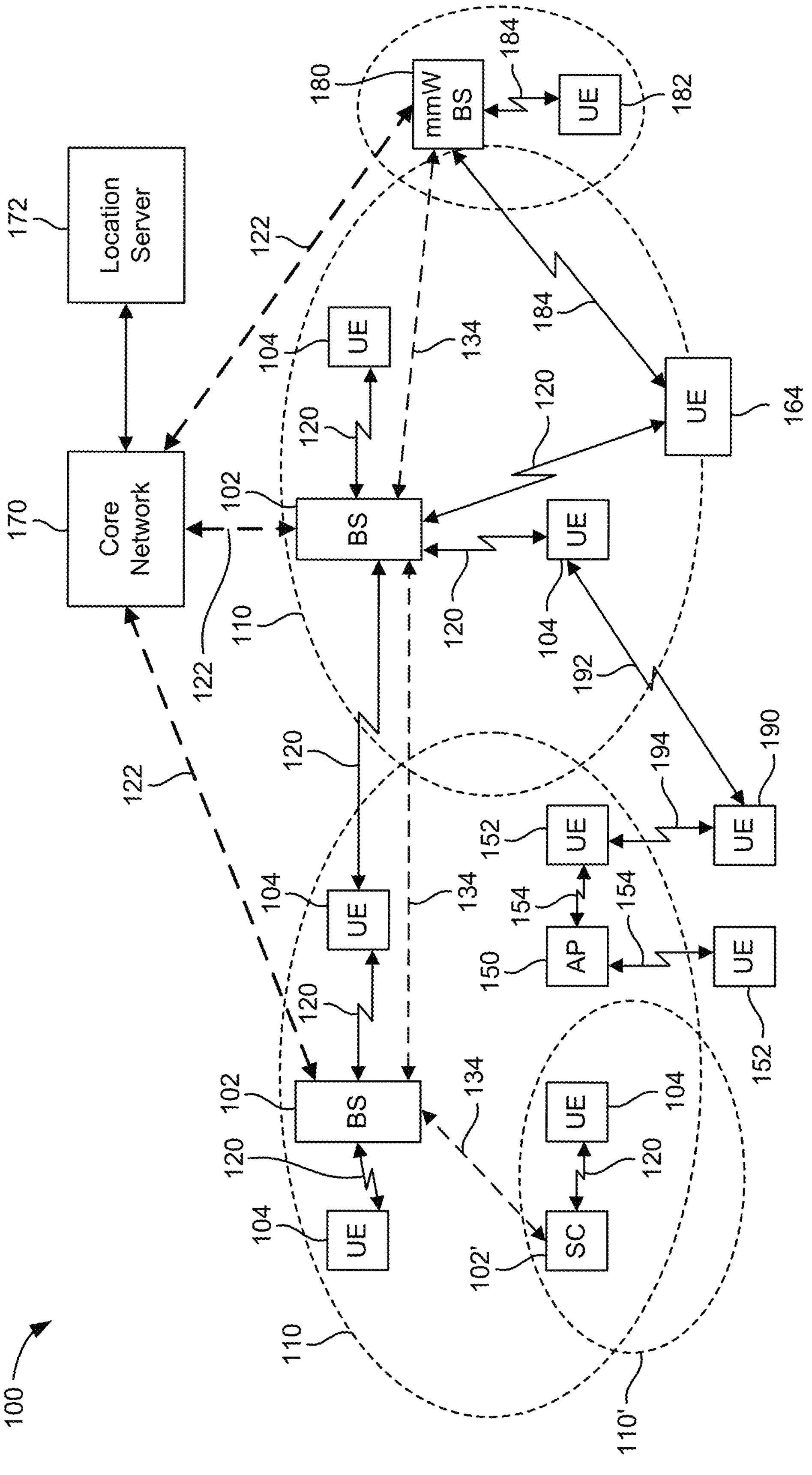
FIG. 1 is a block diagram illustrating an example of a wireless communication network, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some cases, a wireless network and/or wireless device may transmit certain broadcast and/or control messages without cryptographic protection (e.g., encryption). For example, system information messages containing information about how to access the wireless system, such as system information block 1 (SIB 1) message, may be transmitted without encryption to allow a receiving device to decode the message as the device does not yet have access to the wireless system. Such cryptographically unprotected transmissions may be subject to possible eavesdropping. For example, a false base station may eavesdrop on system information messages transmitted by a legitimate base station and the false base station may then send fake system information messages generated using the eavesdropped system information messages (with or without modifying the system information messages) to perform a denial-of-service attack on the legitimate users and associated wireless network.

Systems, apparatuses, electronic devices, methods (also referred to as processes), and computer-readable media (collectively referred to herein as "systems and techniques") are described herein for providing some protection against eavesdropping on a wireless system by providing a pattern selection technique for array puncturing. Array puncturing is technique that may be useful for providing some protection against eavesdropping that may be implemented in a PHY layer. Array puncturing may be performed by switching off (e.g., disabling, turning off, etc.) one or more transmit array elements (e.g., one or more antennas of the transmit array of antennas). Switching off the one or more transmit array elements may be performed by preventing one or more transmit array elements from transmitting when the one or more transmit array elements should transmit. Switching off one or more transmit array elements may be performed in such a way as to induce intentional amplitude/phase distortion in any direction other than the beamforming direction. In some cases, a puncturing pattern where one transmit array element is turned off may be applied for a selected time slot to protect symbols of a message within that time slot. A symbol may be a set of subcarriers (e.g., closely spaced subcarriers) over which data may be transmitted over a period of time (e.g., as shown in FIGS. 5A-5D and FIG. 8 described below). For example, symbols of a message within a time slot may refer to data bits of a message encoded into a set of subcarriers and transmitted during a certain period of time. Similarly, data symbols may refer to symbols which include data bits, symbol(s) of a time slot may include those symbol(s) transmitted during a certain period of time, symbols of a physical uplink shared channel (PUSCH) may refer to data bits of a PUSCH which are encoded into a symbol, and so forth. In some cases, the puncturing pattern may be applied to either demodulation reference signals or data symbols. Switching off one transmit array element in a symbol of a single slot for a message may be sufficient to induce sufficient distortion to prevent an off direction (e.g., having a different direction than a target device) eavesdropper from successfully receiving the message.

In some cases, the time slot selected for puncturing may be determined (e.g., selected) based on the schedule pattern of the message. For example, a message, such as physical uplink control channel (PUCCH) or a physical downlink control channel (PDCCH), may be sent using slot aggregation where certain time slots are retransmitted multiple times. In slot aggregation, data being transmitted may span multiple time slots and the transmission of the data may be automatically repeated a number of times without waiting for feedback for the previous transmission. A receiver may receive and combine the multiple transmissions to obtain the message. Where slot aggregation is used, at least one of the aggregated slots scheduled for the message may be transmitted using a punctured array pattern. This puncturing may prevent the multiple messages from being properly combined as at least one of the messages would be corrupted due to the array puncturing.

As indicated above, disabling a single array element can produce sufficient distortion to make eavesdropping difficult off direction. In some cases, the amount of distortion can be increased, at a cost of a slightly smaller distortion free angular gap around the beamforming direction (e.g., direction of the target device) where distortion is negligible, by increasing a number of array elements that are disabled. In some cases, determining whether increasing the number of array elements to disable may be based on feedback and/or available resources. For example, if a wireless transmitter receives an indication to increase distortion, the wireless transmitter may trigger an update of the beamforming direction based on a regular beam refinement process. This updated beamforming direction may allow the wireless transmitter to increase the number of array elements that are disabled as the wireless transmitter has a more accurate beam direction for beamforming to compensate for the narrower distortion free angular gap. In some examples, the wireless transmitter may request (e.g., schedule, transmit an indication to generate, etc.) a signal quality report (e.g., reference signal received power (RSRP), reference signal received quality (RSRQ), etc.) to detect whether there is increased distortion to the receiver if the transmitter increases the number of array elements that are disabled. In some cases, the network may also negotiate with the wireless device how much of an angular free gap to have for the wireless device (e.g., based on user's mobility pattern). For example, the wireless device may transmit an indication, for example during a capabilities exchange, of a size of the distortion free angular gap for the wireless device. In some cases, a transmitter may receive RSRP reports from served devices where respective reference signals (e.g., CSI-RS) are transmitted and/or repeated in the subsequent symbol durations each being transmitted with a different array puncturing pattern. If the transmitter receives an RSRP report indicating a change more than a threshold, than the transmitter may mark those RSRPs suspicious (e.g., coming from a node in a direction other than the desired user's direction). In some examples, such as for uplink and/or sidelink, the transmitter may determine the number of antenna elements to disable based on an expected movement of the transmitter. An antenna element may include an antenna of an array of antennas.

Additional aspects of the present disclosure are described in more detail below.

Wireless networks are deployed to provide various communication services, such as voice, video, packet data, messaging, broadcast, and the like. A wireless network may support both access links for communication between wireless devices. An access link may refer to any communication link between a client device (e.g., a user equipment (UE), a station (STA), or other client device) and a base station (e.g., a 3GPP gNodeB (gNB) for 5G/NR, a 3GPP eNodeB (eNB) for LTE, a Wi-Fi access point (AP), or other base station) or a component of a disaggregated base station (e.g., a central unit, a distributed unit, and/or a radio unit). In one example, an access link between a UE and a 3GPP gNB may be over a Uu interface. In some cases, an access link may support uplink signaling, downlink signaling, connection procedures, etc.

In some aspects, wireless communications networks may be implemented using one or more modulation schemes. For example, a wireless communication network may be implemented using a quadrature amplitude modulation (QAM) scheme such as 16QAM, 32QAM, 64QAM, etc.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs may communicate with a core network via a RAN, and through the core network the UEs may be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.) and so on.

A network entity may be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs may send signals to a base station is called an uplink (UL) channel (e.g., a reverse traffic channel, a reverse control channel, an access channel, etc.). A communication link through which the base station may send signals to UEs is called a downlink (DL) or forward link channel (e.g., a paging channel, a control channel, a broadcast channel, or a forward traffic channel, etc.). The term traffic channel (TCH), as used herein, may refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (which may also be referred to as a wireless wide area network (WWAN)) may include various base stations 102 and various UEs 104. In some aspects, the base stations 102 may also be referred to as "network entities" or "network nodes." One or more of the base stations 102 may be implemented in an aggregated or monolithic base station architecture. Additionally, or alternatively, one or more of the base stations 102 may be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to a long term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency may be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 may include devices (e.g., UEs, etc.) that communicate with one or more UEs 104, base stations 102, APs 150, etc. utilizing the ultra-wideband (UWB) spectrum. The UWB spectrum may range from 3.1 to 10.5 GHZ.

The small cell base station 102' may operate in a licensed and/or an unlicensed frequency spectrum. When operating in an unlicensed frequency spectrum, the small cell base station 102' may employ LTE or NR technology and use the same 5 GHZ unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Communications using the mmW and/or near mmW radio frequency band have high path loss and a relatively short range. The mmW base station 180 and the UE 182 may utilize beamforming (transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (from 450 to 6000 Megahertz (MHz)), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency and/or component carrier over which some base station is communicating, the term "cell," "serving cell," "component carrier," "carrier frequency," and the like may be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHZ (x component carriers) for transmission in each direction. The component carriers may or may not be adjacent to each other on the frequency spectrum. Allocation of carriers may be asymmetric with respect to the downlink and uplink (e.g., more or less carriers may be allocated for downlink than for uplink). The simultaneous transmission and/or reception of multiple carriers enables the UE 104/182 to significantly increase its data transmission and/or reception rates. For example, two 20 MHZ aggregated carriers in a multi-carrier system would theoretically lead to a two-fold increase in data rate (i.e., 40 MHz), compared to that attained by a single 20 MHz carrier.

In order to operate on multiple carrier frequencies, a base station 102 and/or a UE 104 may be equipped with multiple receivers and/or transmitters. For example, a UE 104 may have two receivers, "Receiver 1" and "Receiver 2," where "Receiver 1" is a multi-band receiver that may be tuned to band (i.e., carrier frequency) 'X' or band 'Y,' and "Receiver 2" is a one-band receiver tuneable to band 'Z' only. In this example, if the UE 104 is being served in band 'X,' band 'X' would be referred to as the PCell or the active carrier frequency, and "Receiver 1" would need to tune from band 'X' to band 'Y' (an SCell) in order to measure band 'Y' (and vice versa). In contrast, whether the UE 104 is being served in band 'X' or band 'Y,' because of the separate "Receiver 2," the UE 104 may measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
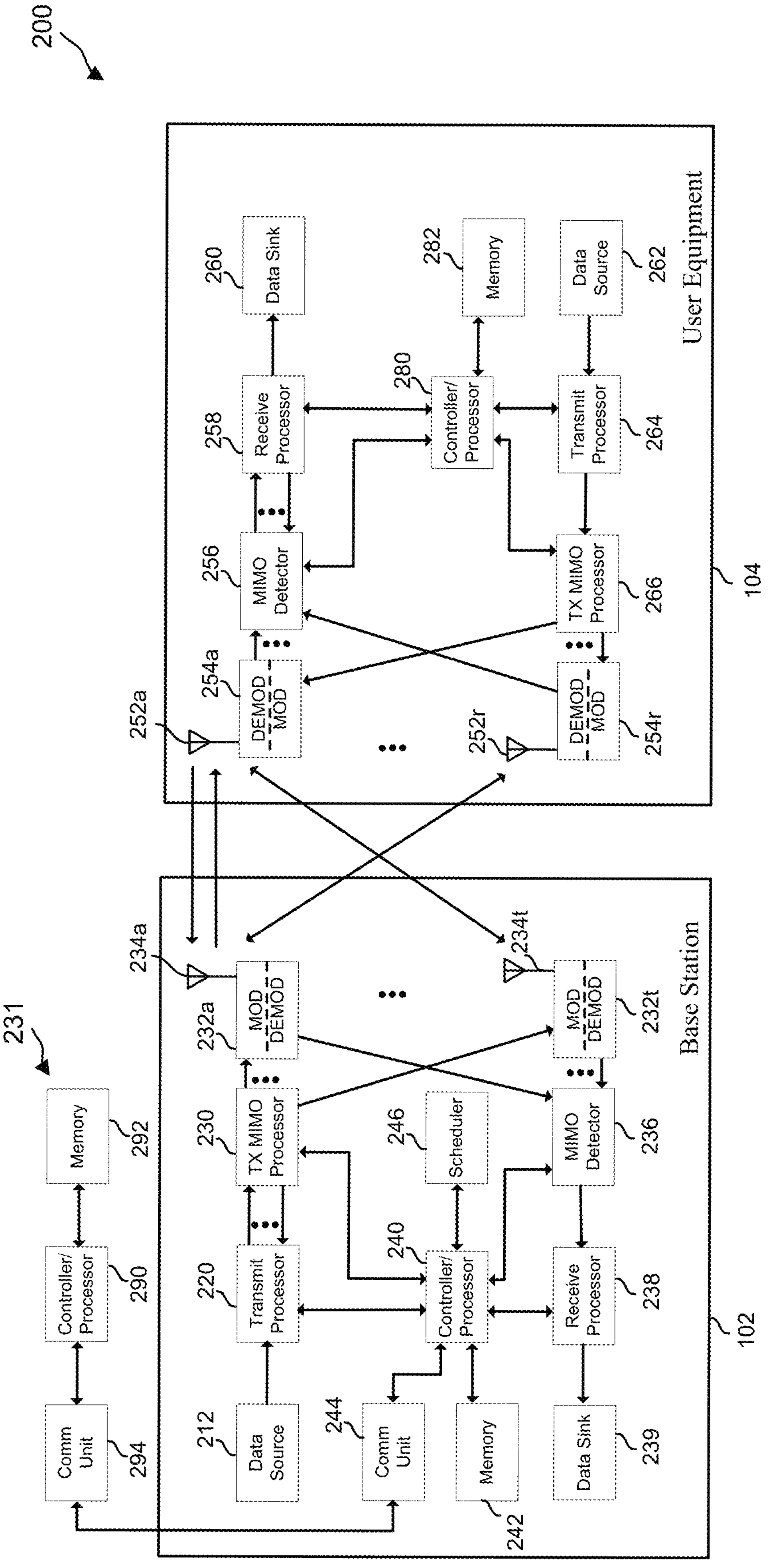
FIG. 2 is a diagram illustrating a design of a base station and a User Equipment (UE) device that enable transmission and processing of signals exchanged between the UE and the base station, in accordance with some examples.

FIG. 2 shows a block diagram of a design of a base station 102 and a UE 104 that enable transmission and processing of signals exchanged between the UE and the base station, in accordance with some aspects of the present disclosure. Design 200 includes components of a base station 102 and a UE 104, which may be one of the base stations 102 and one of the UEs 104 in FIG. 1. Base station 102 may be equipped with T antennas 234*a* through 234*t*, and UE 104 may be equipped with R antennas 252*a* through 252*r*, where in general T≥1 and R≥1.

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators may be separate components. Each modulator of the modulators 232*a* to 232*t* may process a respective output symbol stream, e.g., for an orthogonal frequency-division multiplexing (OFDM) scheme and/or the like, to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals may be generated with location encoding to convey additional information.

At UE 104, antennas 252*a* through 252*r* may receive the downlink signals from base station 102 and/or other base stations and may provide received signals to demodulators (DEMODs) 254*a* through 254*r*, respectively. The demodulators 254*a* through 254*r* are shown as a combined modulator-demodulator (MOD-DEMOD). In some cases, the modulators and demodulators may be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ. CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX-MIMO processor 266 if application, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 if applicable, and further processed by a receive processor 238 to obtain decoded data and control information sent by UE 104. Receive processor 238 may provide the decoded data to a data sink 239 and the decoded control information to controller (processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Figure 3:
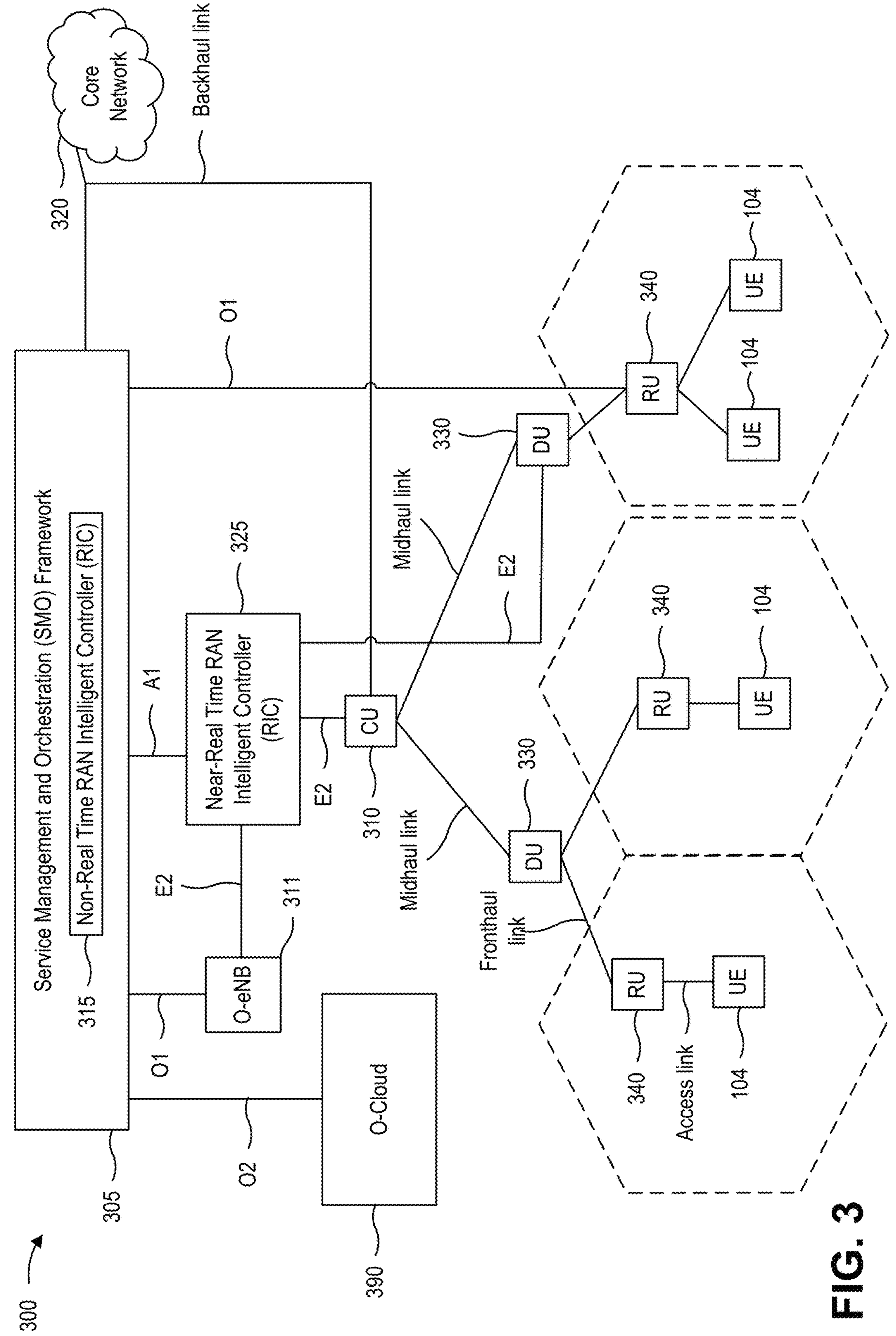
FIG. 3 is a diagram illustrating an example of a disaggregated base station, in accordance with some examples.

FIG. 3 shows a diagram illustrating an example disaggregated base station 300 architecture. The disaggregated base station 300 architecture may include one or more central units (CUs) 310 that may communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 104 via one or more radio frequency (RF) access links. In some implementations, the UE 104 may be simultaneously served by multiple RUs 340.

Each of the units, e.g., the CUS 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 may be logically split into one or more CU-UP units and one or more CU-CP units. The CU-UP unit may communicate bidirectionally with the CU-CP unit via an interface, such as the E1 interface when implemented in an O-RAN configuration. The CU 310 may be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) may be implemented with an interface configured to communicate signals with other layers (and modules) hosted by the DU 330, or with the control functions hosted by the CU 310.

Lower-layer functionality may be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 may be implemented to handle over the air (OTA) communication with one or more UEs 104. In some implementations, real-time and non-real-time aspects of control and user plane communication with the RU(s) 340 may be controlled by the corresponding DU 330. In some scenarios, this configuration may enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements may include, but are not limited to, CUs 310, DUs 330, RUS 340 and Near-RT RICs 325. In some implementations, the SMO Framework 305 may communicate with a hardware aspect of a 4G RAN, such as an open eNB (O-eNB) 311, via an O1 interface. Additionally, in some implementations, the SMO Framework 305 may communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

Figure 4:
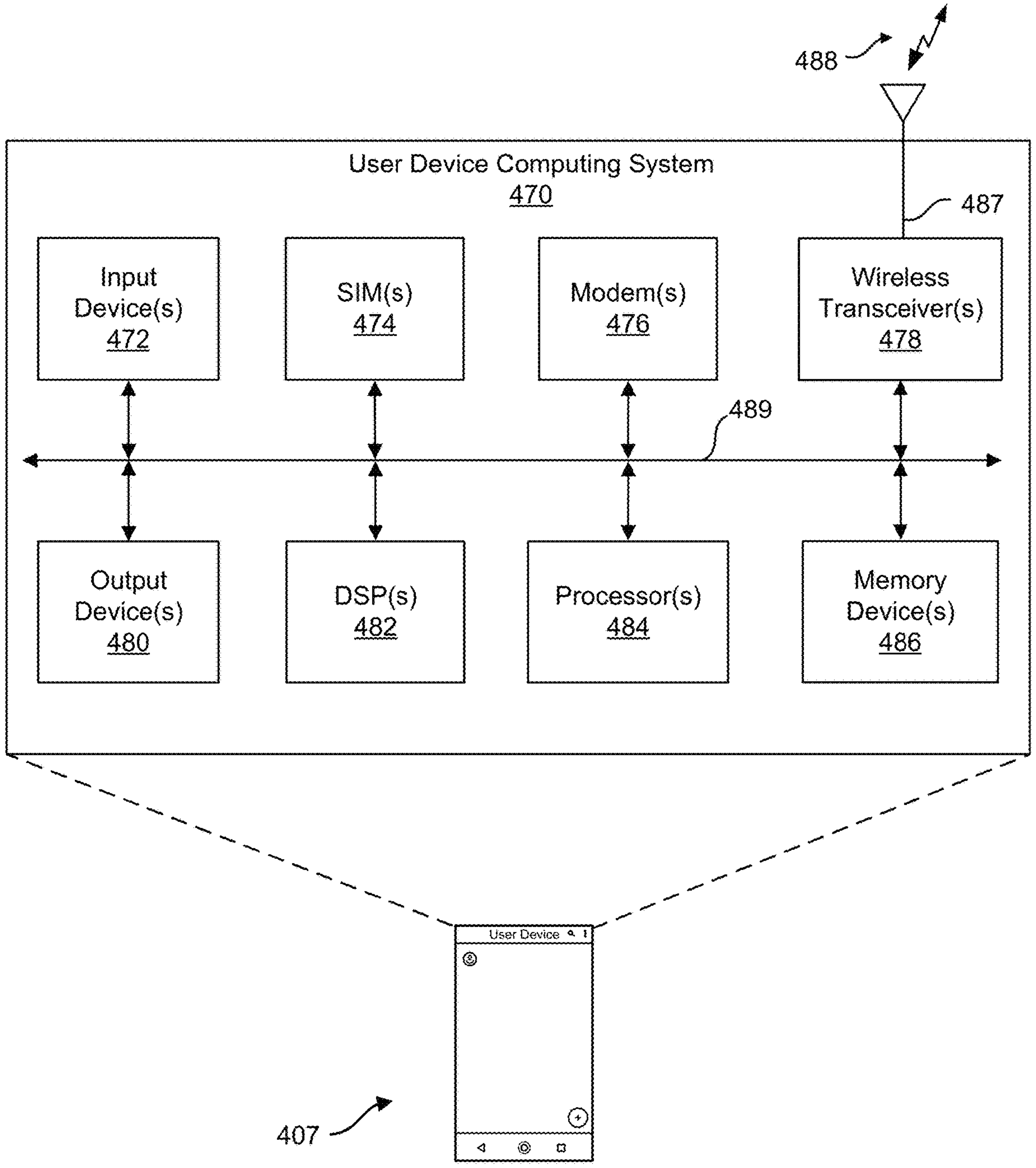
FIG. 4 is a block diagram illustrating components of a user equipment, in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR) or mixed reality (MR) device, etc.), Internet of Things (IoT) device, access point, and/or another device that is configured to communicate over a wireless communications network. The computing system 470 includes software and hardware components that may be electrically or communicatively coupled via a bus 489 (or may otherwise be in communication, as appropriate). For example, the computing system 470 includes one or more processors 484. The one or more processors 484 may include one or more CPUs, ASICs, FPGAS, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more subscriber identity modules (SIMs) 474, one or more modems 476, one or more wireless transceivers 478, one or more antennas 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (also referred to as a signal multiplier) for signal down conversion, a frequency synthesizer (also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable and/or the like. Such storage devices may be configured to implement any appropriate data storage, including without limitation, various file systems, database structures, and/or the like.

In various embodiments, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various embodiments, and/or may be designed to implement methods and/or configure systems, as described herein.

Figure 5B:
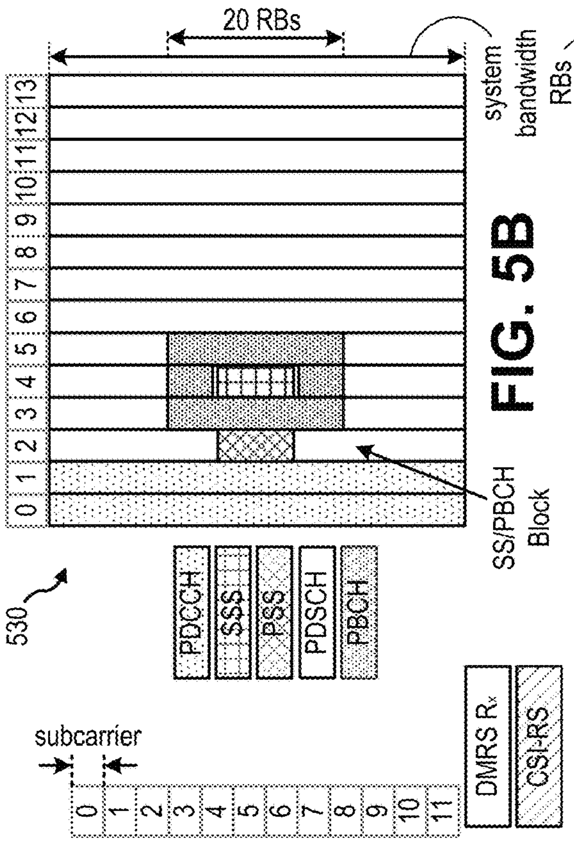
FIGS. 5A-5D depict various example aspects of data structures for a wireless communication network, in accordance with some examples.
Figure 5D:
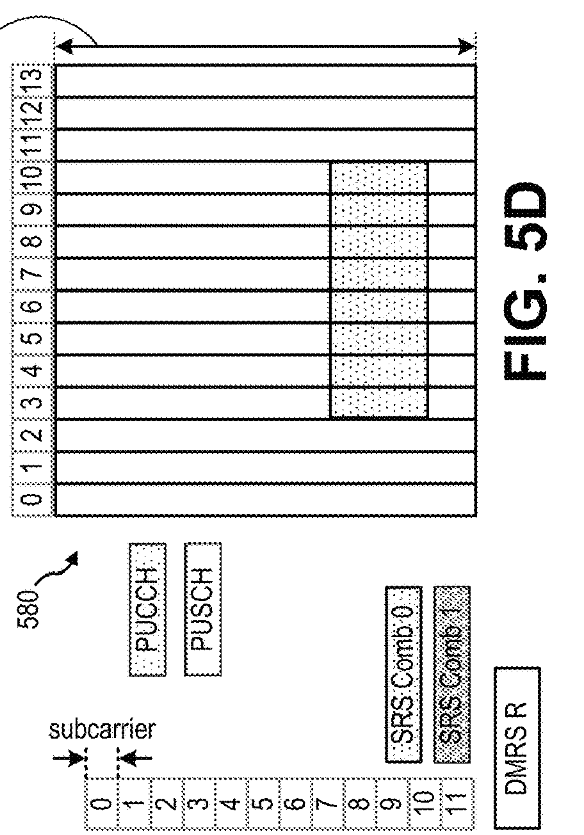
Figure 5A:
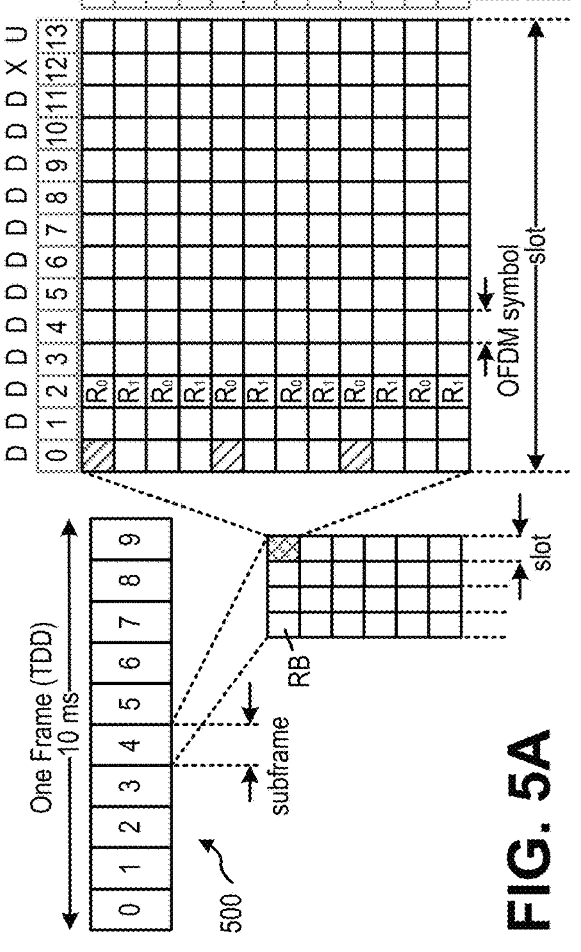
Figure 5C:
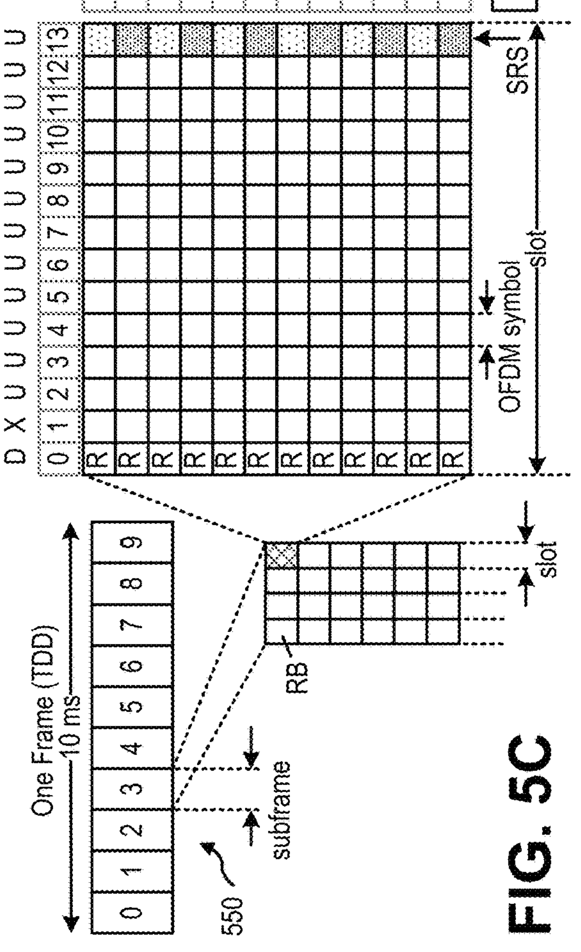

FIGS. 5A-5D depict various example aspects of data structures for a wireless communication system, such as wireless communication system 100 of FIG. 1. FIGS. 5A-5D depict aspects of data structures for a wireless communication network, such as wireless communication network 100 of FIG. 1. In particular, FIG. 5A is a diagram 500 illustrating an example of a first subframe within a 5G (e.g., 5G NR) frame structure, FIG. 5B is a diagram 530 illustrating an example of DL channels within a 5G subframe, FIG. 5C is a diagram 550 illustrating an example of a second subframe within a 5G frame structure, and FIG. 5D is a diagram 580 illustrating an example of UL channels within a 5G subframe.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 5A and 5C, the 5G frame structure is assumed to be TDD, with subframe 4 being configured with slot format 28 (with mostly DL), where Dis DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which May include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to 24× 15 kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 5A-5D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme. The resource grids shown in FIGS. 5A-5D are arranged with the time domain on the horizontal (or x-) axis and the frequency domain on the vertical (or y-) axis. As an example, a PRB may be 180 kilohertz (kHz) wide in frequency and one slot long in time (with a slot being 1 milliseconds (ms) in time). In some cases, the slot may include fourteen symbols (e.g., in a slot configuration 0). In these examples, the RB includes twelve subcarriers (along the y-axis) and fourteen symbols (along the x-axis). An intersection of a symbol and subcarrier can be referred to as a resource element (RE) or tone. For instance, a RE is 1 subcarrier×1 symbol, and is the smallest discrete part of the subframe. A RE includes a single complex value representing data from a physical channel or signal.

As illustrated in FIG. 5A, some of the REs carry reference (pilot) signals (RS) for a UE (e.g., UE 104, UE 152, UE 190). The RS may include demodulation RS (DM-RS) (indicated as Rx for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 5B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., UE 104, UE 152, UE 190) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 5C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 5D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

In some cases, a UE may not be connected to a wireless network (e.g., when there is no NAS signaling connection between the UE and the wireless network). For example, a UE may just have been powered up, may exit from an airplane mode, may have entered a new service area, may receive RRC reconfiguration information, may be involved in a handover procedure, and the like. Such a disconnected UE may be in an idle state and the UE may listen for wireless networks for which to connect. After the UE identifies a wireless network, the UE may then attempt to connect to the wireless network. In some cases, the UE may attempt to connect to the wireless network via a wireless node to establish an RRC connection.

In some systems, narrow-beam transmission and reception may be useful for improving a link budget, such as at millimeter-wave (mmW) frequencies, but may be susceptible to beam failure. As an example, in mmW, directional beamforming may be used between the UE and a BS, and the UE and BS communicate via a beam pair link (BPL). A beam failure generally refers to a scenario in which the quality of a beam falls below a threshold, which may lead to radio link failure (RLF). NR supports a lower layer signaling to recover from beam failure, referred to as beam recovery. For example, instead of initiating a cell reselection when a beam quality becomes too low, a beam pair reselection within the cell may be performed.

Figure 6:
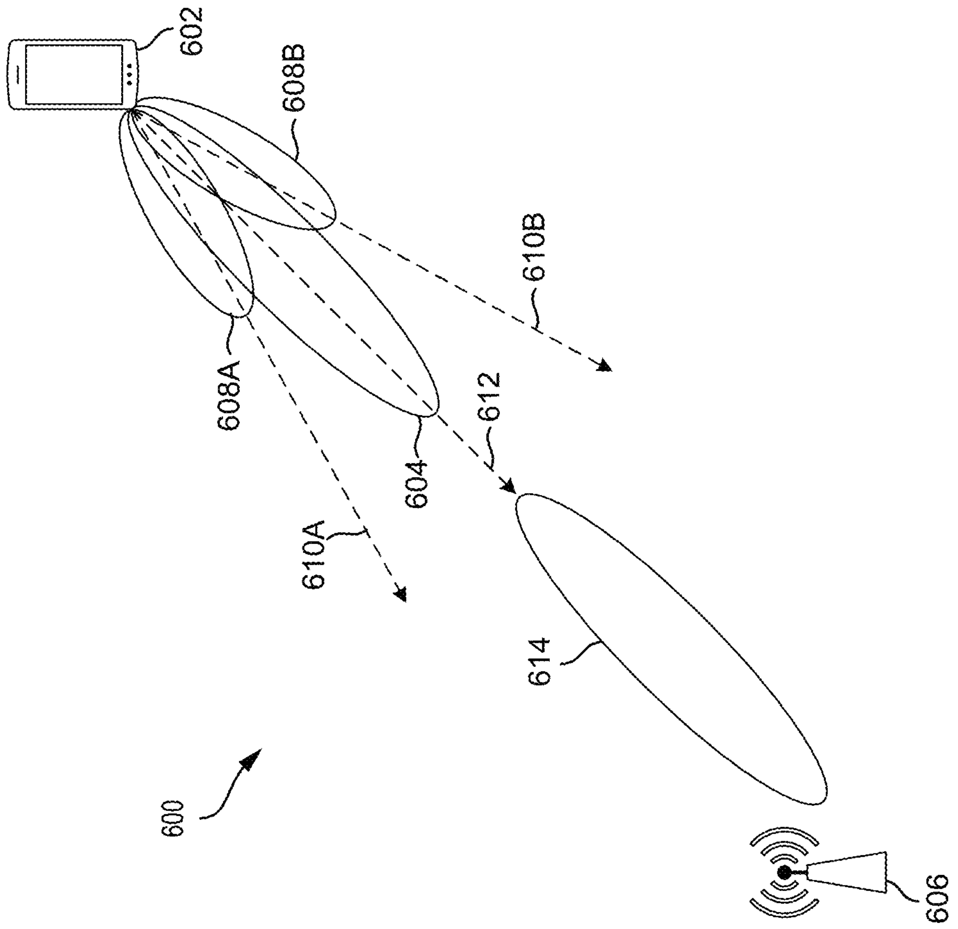
FIG. 6 is a schematic view illustrating an example of a wireless communication system performing beamforming, in accordance with aspects of the present disclosure.

FIG. 6 is a schematic view illustrating an example of a wireless communication system performing beamforming 600, in accordance with aspects of the present disclosure. Transmit beamforming is a technique for focusing an RF signal in a specific direction. Traditionally, when a network node or entity (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). As shown in FIG. 6, a device 602 may use beamforming to transmit a stronger primary beam 604 towards a receiver 606, as compared to secondary beams 608A and 608B. The secondary beams 608A and 608B may be transmitted in a different directions 610A and 610B as compared to a direction 612 of the primary beam 604. To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while canceling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receiving beamforming, the receiver 606 uses a receive beam 614 to amplify RF signals detected on a given channel. For example, the receiver 606 can increase the gain setting and/or adjust the phase setting of an array of antennas in a particular direction to amplify (e.g., to increase the gain level of) the RF signals received from that direction. Thus, when a receiver 606 is said to beamform in a certain direction, it means the beam gain in that direction is high relative to the beam gain along other directions, or the beam gain in that direction is the highest compared to the beam gain of other beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam, such as primary beam 604, for a second reference signal can be derived from information about a receive beam, such as receive beam 614, for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a network node or entity (e.g., a base station). The UE can then form a transmit beam for sending one or more uplink reference signals (e.g., uplink positioning reference signals (UL-PRS), sounding reference signal (SRS), demodulation reference signals (DMRS), PTRS, etc.) to that network node or entity (e.g., a base station) based on the parameters of the receive beam.

Note that a "downlink" beam may be either a transmit beam or a receive beam, depending on the entity forming it. For example, if a network node or entity (e.g., a base station) is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a network node or entity (e.g., a base station) is forming the uplink beam, it is an uplink receive beam, and if a UE is forming the uplink beam, it is an uplink transmit beam.

In some cases, a wireless network and/or wireless device may transmit certain broadcast and/or control messages without cryptographic protection (e.g., encryption). For example, system information messages containing information about how to access the wireless system, such as system information block 1 (SIB 1) message, PUCCH/PUSCH, etc., may be transmitted without encryption to allow a receiving device to decode the message. Such cryptographically unprotected transmissions may be subject to possible eavesdropping. For example, a false base station may eavesdrop on system information messages transmitted by a legitimate base station and the false base station may then send fake system information messages generated using the eavesdropped system information messages to perform a denial-of-service attack on the legitimate base station and associated wireless network.

One technique that may be useful for providing some protection against eavesdropping that may be implemented in a PHY layer is array puncturing. Array puncturing may be performed by switching off one or more transmit array elements (e.g., one or more antennas of the transmit array of antennas). Switching off one or more transmit array elements may be performed in such a way as to induce intentional amplitude/phase distortion in any direction other than the beamforming direction.

Figure 7:
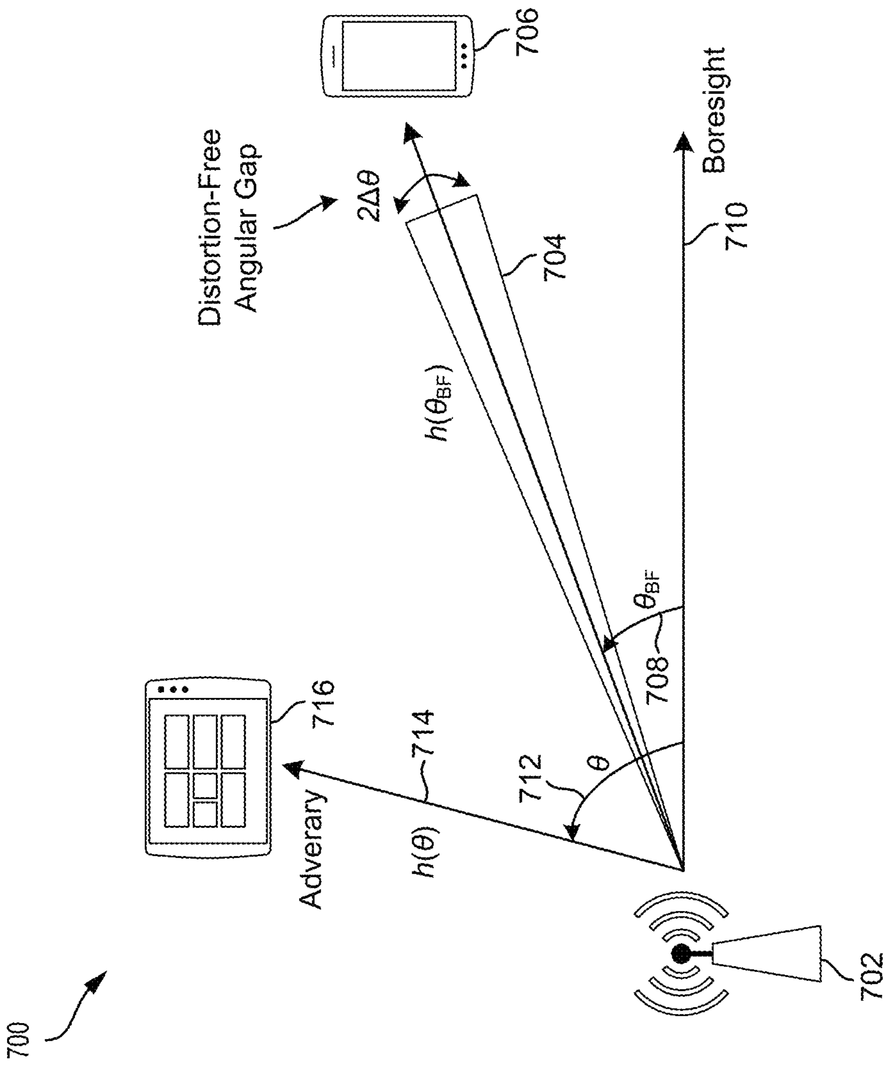
FIG. 7 is a schematic view illustrating array puncturing, in accordance with aspects of the present disclosure.

FIG. 7 is a schematic view illustrating array puncturing 700, in accordance with aspects of the present disclosure. As shown in FIG. 7, a transmitting device 702, such as a wireless node, may use beamforming to transmit a beamformed transmission (e.g., a transmission which has been beamformed) along a channel $h(\theta_{BF})$ 704 (e.g., beam) towards a receiving device 706, such as a UE. In some cases, the receiving device 706 may be a number of degrees $\theta_{BF}$ 708 off a boresight 710 of the transmit array of the transmitting device 702. The boresight 710 of transmit array may refer to the axis of maximum going for the transmit array when the transmit array is not performing beamforming. In some cases, the number of degrees $\theta_{BF}$ 708 off the boresight 710 the receiving device 706 is may be inferred, for example, based on synchronization signal block (SSB) direction. The transmitting device 702 may switch off one or more array elements (e.g., array puncturing) to induce an amplitude/phase distortion in other directions not equal to $\theta_{BF}$ 708, where $\theta \neq \theta_{BF}$, such as θ 712 and corresponding channel h(θ) 714, where an adversary device 716 may be. An effective channel for beamforming towards the receiving device 706 may then be defined as:

$$h(\theta)^H[b \odot w(\theta_{BF})]x = \sum_{n=0}^{N-1} b_n \exp\left(j\frac{2\pi}{\lambda}\left(n - \frac{N-1}{2}\right)d[\sin(\theta) - \sin(\theta_{BF})]\right) \quad (1)$$

where b is the puncturing vector, w is a beamforming vector, and N indicates a number of antenna elements. The puncturing vector b defines the puncturing pattern b (k) of the array elements and the values of elements b can be {0, 1}, where elements of the vector b correspond with transmit array elements of the antenna.

In some cases, such as where the number of switched off array element is relatively small, the amount of degradation in array gain due to array puncturing may be relatively small. Generally, when performing beamforming without array puncturing, the channel may be defined as $h(\theta)^H w(\theta_{BF})$. Thus, when array puncturing is performed and the beam in the direction of the received device 706 is being transmitted, all of the transmit array elements of the antenna are being used and $h(\theta)^H [b \odot w(\theta_{BF})] = h(\theta)^H w(\theta_{BF})$ and the effective channel is the same. Moreover, $[\sin(\theta) - \sin(\theta_{BF})]$ is zero when $\theta = \theta_{BF}$, thus exp $$\left(j\frac{2\pi}{\lambda}\left(n - \frac{N-1}{2}\right)d[\sin(\theta) - \sin(\theta_{BF})]\right)$$

goes to 1 and Equation 1 becomes the same as the non-puncturing case. However, when not all transmit array elements of the N antenna elements are being used (e.g., where $\theta \neq \theta_{BF}$), the exponential portion becomes a complex value and the effective channel differs as compared to beamforming without array puncturing, inducing amplitude/phase distortion.

Different results (realizations) for the puncturing vector b may be obtained by switch off different array elements where $\theta \neq \theta_{BF}$. Where p indicates a number of array elements for the N antennas, then $p = N - \Sigma b_n$, and there are $N_p$ different choices for b such that $$N_p = \binom{N}{p}.$$

Thus, each result for the puncturing vector b may induce a different phase for a particular direction θ (s.t. $\theta \neq \theta_{BF}$), which distorts channel estimation (and hence coherent demodulation) quality of any adversary at θ (s.t. $\theta \neq \theta_{BF}$) while keeping an angular region around beamforming direction (i.e., $|\theta - \theta_{BF}| \leq \Delta\theta$) intact.

In some cases, effectiveness of array puncturing may be based on how a puncturing pattern (e.g., when to disable one or more transmit array elements) is applied and whether the puncturing pattern takes into consideration features of the message to be protected and other possible side effects.

Figure 8:
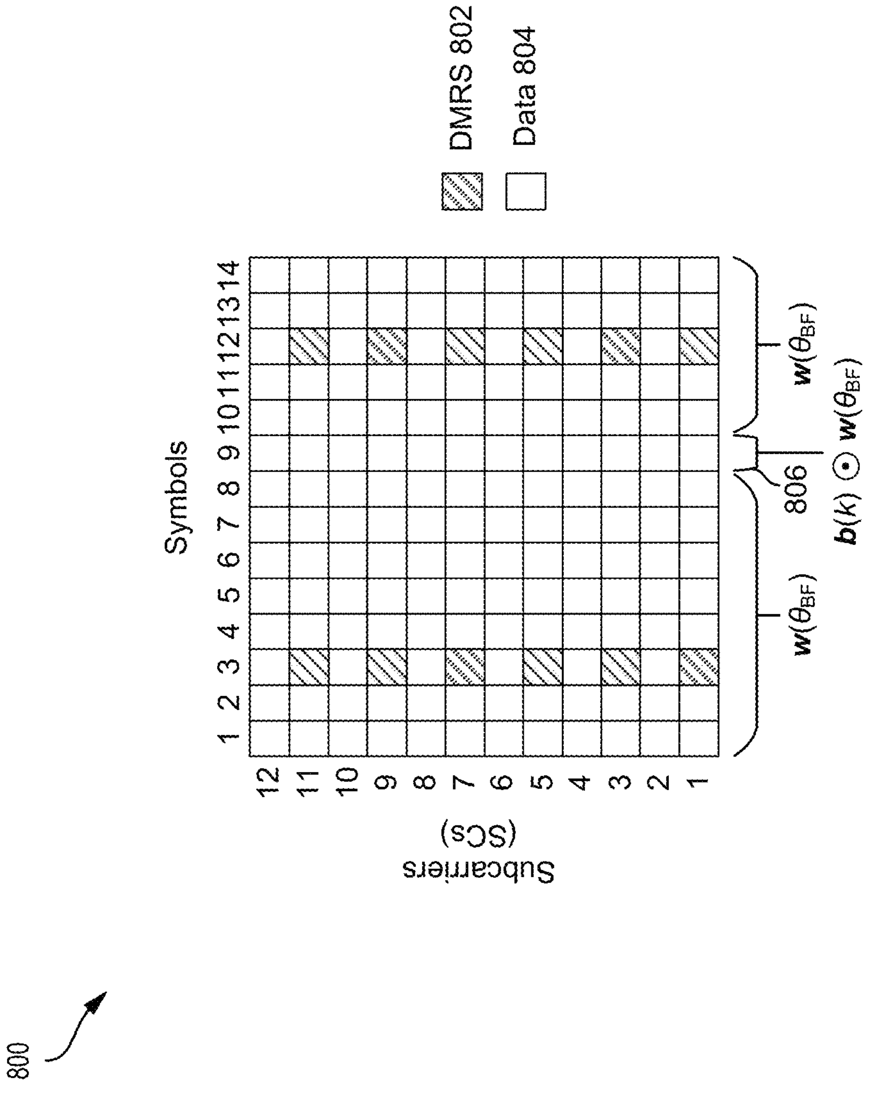
FIG. 8 is a diagram of an RB that may be punctured, in accordance with aspects of the present disclosure.

For example, a puncturing pattern may be applied once for a selected time slot where the puncturing pattern may be applied to transmissions of any OFDM symbol within the selected time slot (e.g., for directions where $\theta \neq \theta_{BF}$). FIG. 8 is a diagram of an RB 800 that may be punctured, in accordance with aspects of the present disclosure. In FIG. 8, RB 800 is arranged with the time domain on the horizontal (or x-) axis and the frequency domain on the vertical (or y-) axis. In this example, RB 800 may be 1 slot long in time and includes fourteen symbols (along the x-axis) and twelve subcarriers (along the y-axis). In some cases, a puncturing pattern b(k) (where $k \in 1, \ldots, N_p$) may be applied one or more times per time slot selected for puncturing (e.g., one or more symbols of the time slot may be selected for puncturing). The OFDM symbol which is transmitted with a punctured array may be selected randomly across the slot among OFDM symbols scheduled to transmit the unprotected message (e.g., SIB1, unprotected DCI, MIB, PUCCH, PDCCH (e.g., PxCCH), PDSCH, etc.), or the OFDM symbol to be transmitted with the punctured array may be selected based on a pattern. In some cases, this pattern may be based on RF capabilities of the hardware performing the puncturing (e.g., ability of the hardware, such as a transmitter, to switch on/off certain transmitting arrays, speed at which the transmitting array can be switch on/off, etc.). In some cases, the puncturing pattern may be applied to either DMRS 802 or data symbols 804.

In RB 800, array puncturing may be applied to OFDM symbol 9 806. As OFDM symbol 9 806 is transmitted by the punctured array, the effective channel for OFDM symbol 9 806 is $h(\theta)^H [b \odot w(\theta_{BF})]$, while the channel seen by the DMRS symbol is $h(\theta)^H w(\theta_{BF})$. Any potential adversary receiving RB 800 may estimate the channel using the DMRS symbol and then may fail to estimate the effective channel to demodulate the OFDM symbol 9 806 (and possible other symbols as well). In cases where the puncturing pattern is applied to DMRS symbols, a quality of the channel estimate for decoding the RB 800 is degraded, preventing an adversary device from decoding the message including in RB 800. Where an adversary replays a received message without attempting to demodulate/read the message including in the RB 800, the replayed message may become corrupted due to the array puncturing and a potential victim UE may not be able to successfully demodulate/read the replayed message.

Figure 9:
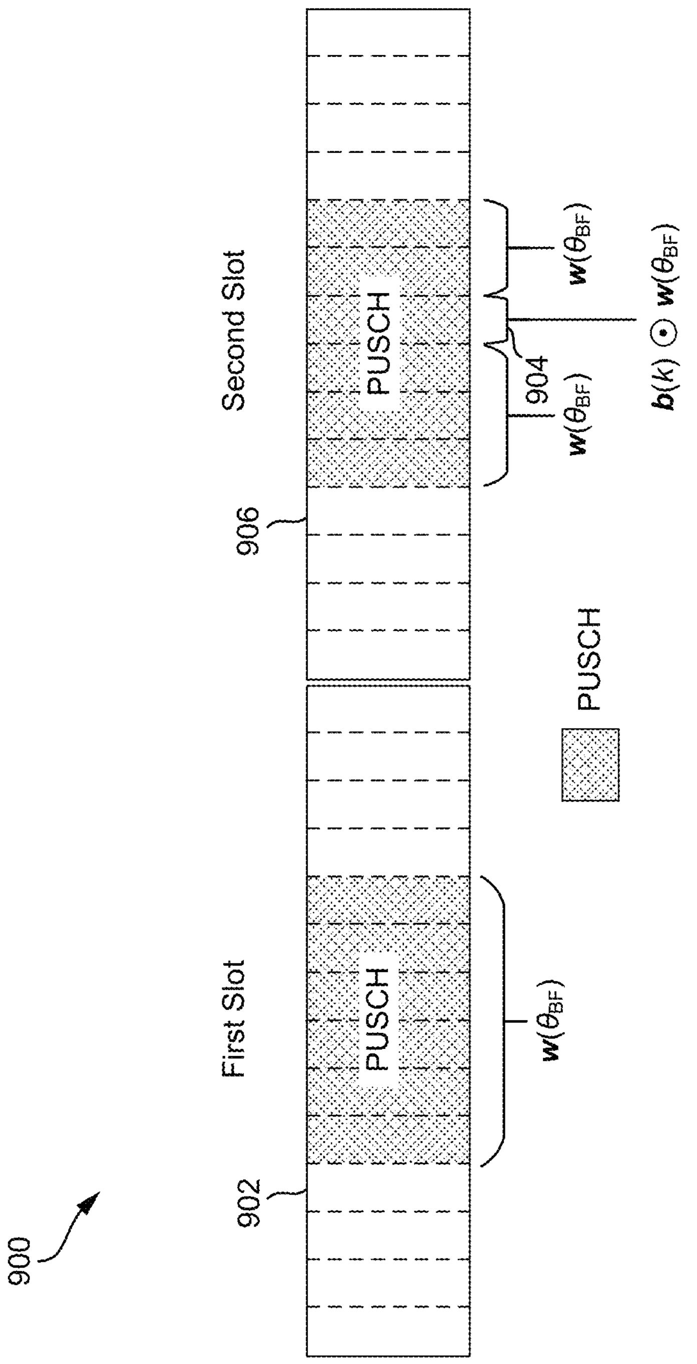
FIG. 9 is a schematic view illustrating an example of array puncturing for slot aggregation, in accordance with aspects of the present disclosure.

In some cases, the time slot for array puncturing may be selected based on the schedule pattern of the message to be protected. For example, PDCCH messages may be aggregated over multiple transmissions depending on the aggregation level of the messages. Thus, a receiver may receive portions of a PDCCH message over multiple transmissions and combine these messages together to obtain the PDCCH message. FIG. 9 is a schematic view illustrating an example of array puncturing for slot aggregation 900, in accordance with aspects of the present disclosure. As shown in FIG. 9, a PUSCH may be aggregated over two slots (aggregation level=2). In cases where slot aggregation is used, array puncturing may be applied to any time slot based on the aggregation level such that any slot scheduled for aggregation level greater than 1 (e.g., slot aggregation over more than one slot) can be selected for puncturing. For example, a first slot 902 may be transmitted without array puncturing and array puncturing 904 may be applied for a second slot 906. This way, a potential adversary receiving (e.g., for directions where $\theta + \theta_{BF}$, potential adversary not collocated) may receive different versions of the transmission and may not be able to properly aggregate the transmissions over different slots into the message as at least one of transmissions to be aggregated (the one with the array puncturing) is corrupted due to lack of accurate estimate of the effective channel. Array puncturing may be applied to aggregated slots scheduled to transmit PUSCH in a similar way. In some cases, more than one (or possibly all) OFDM symbols and/or slots scheduled to transmit the message to be protected can also be selected to further degrade estimation quality at the adversary. Of note, while discussed in the context of OFDM, it should be understood that the techniques discussed herein may also be applied to waveforms other than OFDM.

In some cases, a number of array elements used for array puncturing may be adjusted. Turning off (e.g., puncturing) more than one antenna element may provide more severe phase distortion and a smaller angular gap around the beamforming direction (e.g., around where $\theta=\theta_{BF}$) within which distortion is negligible. In some cases, while puncturing more antenna elements can induce more phase distortion towards adversaries, puncturing more antenna elements may also impact the target receiver since the distortion-free angular gap around the beamforming direction shrinks. For example, turning off one (e.g., puncturing) array element for array puncturing may result in a distortion free angular gap of a certain size (e.g., ±2.5° around $\theta_{BF}$). Turning off two array elements for array puncturing may result in a narrower distortion free angular gap (e.g., ±2.0° around $\theta_{BF}$) and a more rapid increase in phase distortion as $\theta$ diverges from $\theta_{BF}$ as compared to turning off one array element.

To assist in determining the number of array elements that may be punctured, feedback (e.g., from the receiver or network) may be used. For example, on a downlink (e.g., transmitting a message from the network node or entity to a wireless device), the transmitter of the message (e.g., network node, smart repeater, or other network entity) may adjust a number of array elements to puncture based on available radio resources. In some cases, adjusting the number of array elements to puncture may occur based on feedback from the wireless network or other network nodes/entities indicating that the phase distortion should be increased/decreased. For example, the wireless network may receive an indication that an adversary device is operating, and the wireless network may indicate to the network nodes/entities to increase phase distortion off the beamforming direction. In some cases, the transmitter may also/instead determine whether to turn off one or more array elements (e.g., to increase/decrease phase distortion) based on how likely the intended receiver is to be within the distortion free angular gap. For example, if the intended receiver is not moving, the transmitter may decide to use array puncturing with a narrower distortion free angular gap and turn off multiple array elements. However, if the intended receiver is moving, then the transmitter may decide to user array puncturing with a wider distortion free angular gap and turn off fewer or just one array element. Thus, even if the wireless node/entity receives an indication to increase phase distortion, the wireless node/entity may not increase a number of antenna elements to puncture if the wireless node/entity determines that a particular wireless device may be negatively impacted by the increased phase distortion, such as if the wireless device is in motion.

In some cases, rather than avoiding increased phase distortion from puncturing more antenna elements, the wireless node/entity may update/revise the beamforming direction using a regular beam refinement process (e.g., P1-P3 beam refinement) to update/revise/adjust the beamforming vector to fit within a narrower distortion free angular gap. As an example, after receiving an indication to increase phase distortion from the wireless network, the wireless node/entity may trigger an update the beamforming direction for wireless devices to update/revise/adjust the beamforming vector to help support an increase in the number of antenna elements to puncture.

In some examples, after adjusting the number of antenna elements to puncture, the wireless node/entity may configure a wireless device to measure and report back information about the signal quality. For example, the wireless node/entity may configure the wireless device to measure and report a reference signal received power (RSRP) and/or reference signal received quality (RSRQ) back to the wireless node/entity after increasing a number of punctured antenna elements to detect possible degradation as a result of increasing the number of punctured antenna elements. The wireless node/entity may then readjust the number of punctured antenna elements based on the returned signal quality (e.g., RSRP/RSRQ) reports.

In some cases, the wireless node/entity may negotiate with a wireless device regarding a requirement for a size of the distortion free angular gap. For example, the wireless node/entity may query the wireless device and the wireless device may indicate that the wireless device can handle a certain amount of phase distortion or a required size of the distortion free angular gap. The wireless node/entity may then adjust the number of punctured antenna elements based on the indicated amount of phase distortion or required size of the distortion free angular gap.

In some cases, if a transmitter, such as a wireless node/entity, receives RSRP/RSRQ reports indicating a change over time more than a threshold amount, then the transmitter may mark those RSRPs as possibly coming from an off-direction adversary. For example, if the transmitter is using array puncturing to transmit to target wireless devices, the RSRP/RSRQ should not substantially fluctuate more than a certain amount as the transmitter should be targeting the target wireless devices to include them in the distortion free angular gaps for array puncturing. In some cases, such as for omni-directional-like transmission in sub7-GHz band, RSRP/RSRQ fluctuations might help the transmitter to distinguish on-direction (i.e., desired target wireless devices) and off-direction receivers which are may otherwise be difficult to detect.

In some cases, such as for uplink/sidelink, a transmitter, such as a wireless device, can determine whether to adjust the number of punctured antenna elements (e.g., what size of a distortion free angular gap) based on its own mobility as the transmitter may know its own mobility pattern (e.g., expected movement of the transmitter determined based on, for example, a current speed, direction, or acceleration of the transmitter). The transmitter (e.g., wireless device) may then perform much the same techniques as discussed above.

Figure 10:
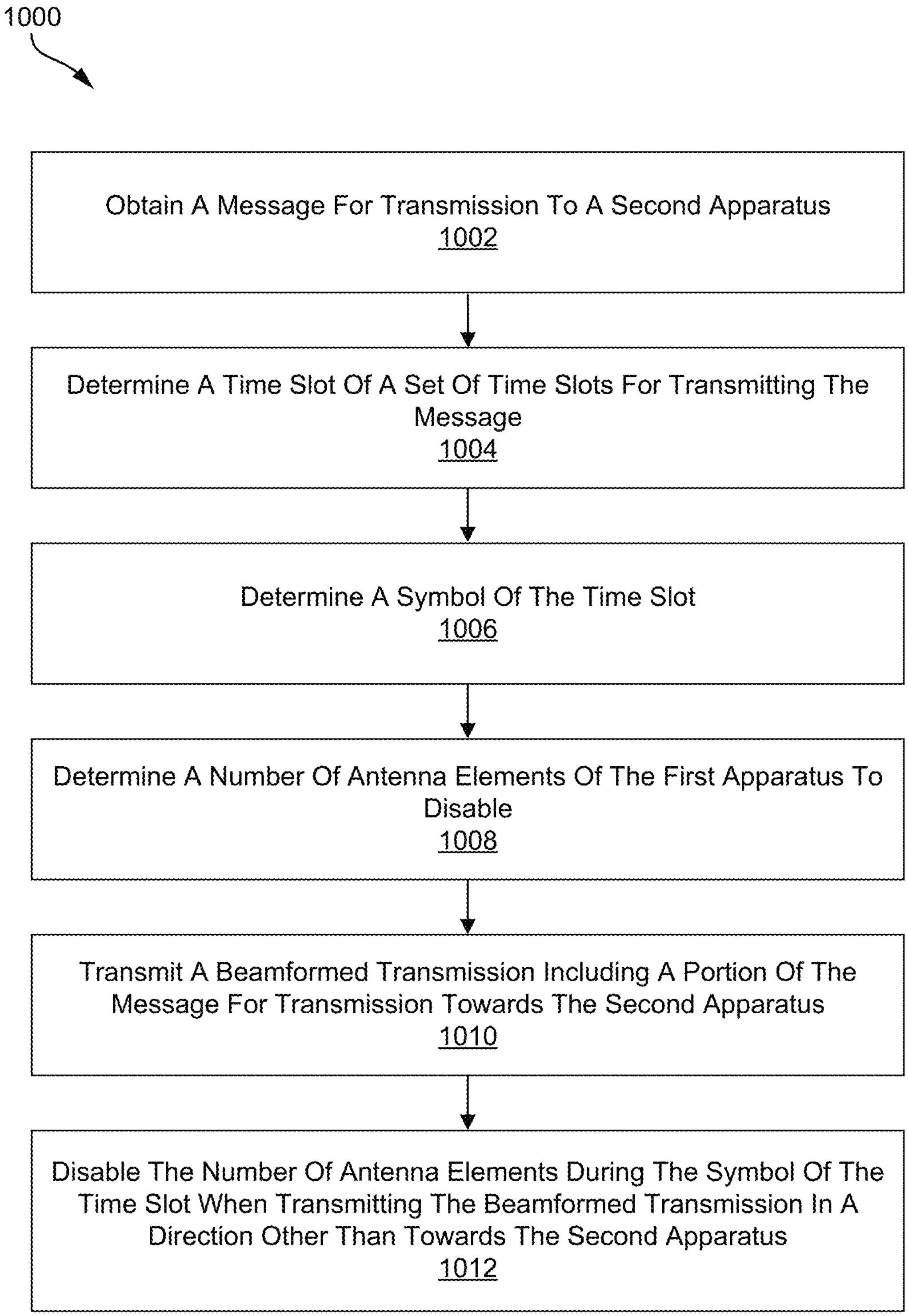
FIG. 10 is a flow diagram of a process for wireless communications, in accordance with aspects of the present disclosure.

FIG. 10 is a flow diagram of a process 1000 for wireless communications, in accordance with aspects of the present disclosure. The process 1000 may be performed by a computing device (or apparatus) or a component (e.g., a chipset, codec, etc.) of the computing device. The computing device may be a mobile device (e.g., a UE, such as UEs 104, 152, 164, and 182 of FIG. 1 and FIG. 2, wireless device 407 of FIG. 4, and/or computing system 1100 of FIG. 11), a network-connected wearable such as a watch, an extended reality (XR) device such as a virtual reality (VR) device or augmented reality (AR) device, a vehicle or component or system of a vehicle, a network node/entity/device (e.g., a BS 102, AP 150, mmW BS 180 of FIG. 1, RU 340 of FIG. 3), wireless device (e.g., device 602 of FIG. 6, transmitting device 702 of FIG. 7), or other type of computing device.

The operations of the process 1000 may be implemented as software components that are executed and run on one or more processors.

At block 1002, the computing device (or component thereof) may obtain a message (e.g., an unprotected message such as SIB1, unprotected DCI, MIB, PUCCH, PDCCH (e.g., PxCCH), PDSCH, etc.) for transmission to a second apparatus.

At block 1004, the computing device (or component thereof) may determine a time slot (e.g., for RB 800 of FIG. 8) of a set of time slots for transmitting the message. In some cases, the time slot is determined based on the message for transmission.

At block 1006, the computing device (or component thereof) may determine a symbol (e.g., OFDM symbol 9 806 of FIG. 8) of the time slot. In some cases, the symbol includes at least one of data or a demodulation reference signal (DMRS). In some examples, the symbol is determined randomly. In some cases, the symbol is determined based on a radio frequency capability of the first apparatus (e.g., ability to switch on/off certain transmitting arrays, speed at which the transmitting array can be switch on/off, etc.).

At block 1008, the computing device (or component thereof) may determine a number of antenna elements (e.g., one or more) of the first apparatus to disable. In some cases, the computing device (or component thereof) may receive an indication to increase distortion (e.g., based on feedback and/or available resources) and determine the number of antenna elements to disable based on the indication to increase distortion. In some examples, the computing device (or component thereof) may perform a beam refinement process (e.g., P1-P3 beam refinement) based on the indication to increase distortion. In some cases, the computing device or component thereof) may transmit, to the second apparatus, an indication to generate a reference signal received power (RSRP) report based on the indication to increase distortion, receive, from the second apparatus, the RSRP report, and determine the number of antenna elements to disable based on the RSRP report. In some examples, the computing device (or component thereof) may receive, from the second apparatus, an indication of a size of a distortion free angular gap and determine the number of antenna elements to disable based on the indicated size of the distortion free angular gap. In some cases, the computing device or component thereof may determine an expected movement of the first apparatus (e.g., expected movement of the transmitter determined based on, for example, a current speed, direction, or acceleration of the transmitter) and determine the number of antenna elements to disable based on the expected movement.

At block 1010, the computing device (or component thereof) may transmit a beamformed transmission (e.g., primary beam 604 of FIG. 6) including a portion of the message for transmission towards the second apparatus. In some cases, the message is transmitted using slot aggregation in at least two aggregated slots, and wherein the time slot is determined based the at least two aggregated slots.

At block 1012, the computing device (or component thereof) may disable the number of antenna elements during the symbol of the time slot when transmitting the beamformed transmission in a direction other than towards the second apparatus.

In some examples, the processes described herein (e.g., process 1000 and/or other process described herein) may be performed by a computing device or apparatus (e.g., a UE or a base station). In another example, the process 1000 may be performed by the UE 104 of FIG. 1. In another example, the process 1000 may be performed by a computing device with the computing system 1100 shown in FIG. 11.

In some cases, the devices or apparatuses configured to perform the operations of the process 1000 and/or other processes described herein may include a processor, microprocessor, microcomputer, or other component of a device that is configured to carry out the steps of the process 1000 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 1000 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1000 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 1000 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Figure 11:
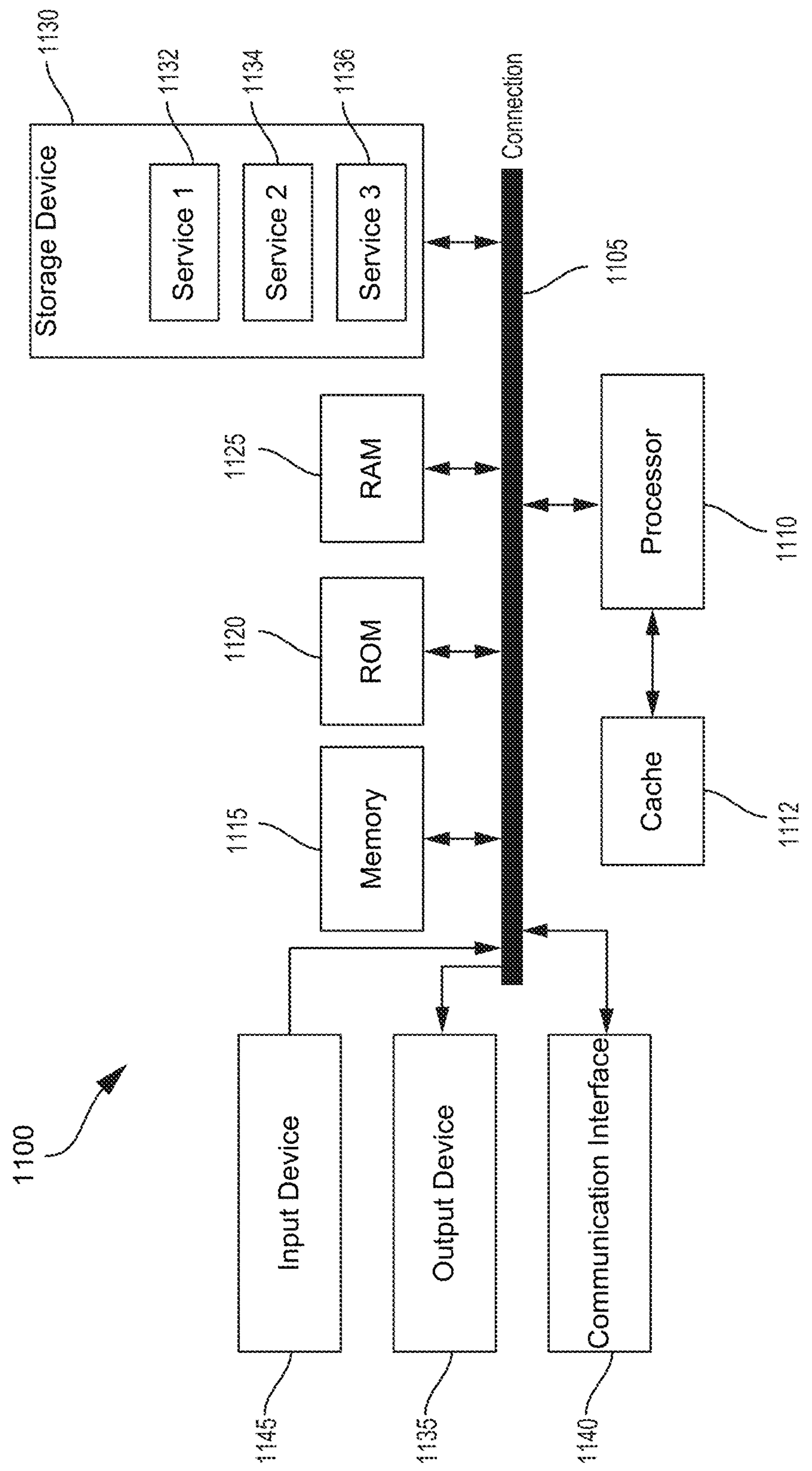
FIG. 11 is a diagram illustrating an example of a computing system, according to aspects of the disclosure.

FIG. 11 is a diagram illustrating an example of a system for implementing certain aspects of the present technology. In particular, FIG. 11 illustrates an example of computing system 1100, which may be for example any computing device making up internal computing system, a remote computing system, a camera, or any component thereof in which the components of the system are in communication with each other using connection 1105. Connection 1105 may be a physical connection using a bus, or a direct connection into processor 1110, such as in a chipset architecture. Connection 1105 may also be a virtual connection, networked connection, or logical connection.

In some embodiments, computing system 1100 is a distributed system in which the functions described in this disclosure may be distributed within a datacenter, multiple data centers, a peer network, etc. In some embodiments, one or more of the described system components represents many such components each performing some or all of the function for which the component is described. In some embodiments, the components may be physical or virtual devices.

Example computing system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 may include a cache 1112 of high-speed memory connected directly with, in close proximity to, or integrated as part of processor 1110.

Processor 1110 may include any general purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms. In some instances, multimodal systems may enable a user to provide multiple types of input/output to communicate with computing system 1100.

Computing system 1100 may include communications interface 1140, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug. 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1130 may include software services, servers, services, etc., that when the code that defines such software is executed by the processor 1110, it causes the system to perform a function. In some embodiments, a hardware service that performs a particular function may include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed by one or more processors, performs one or more of the methods, algorithms, and/or operations described above. The computer-readable data storage medium may form part of a computer program product, which may include packaging materials. The computer-readable medium and/or memory system may comprise any memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, memory 1115, read-only memory (ROM) 1120, random access memory (RAM) 1125, storage device 1130, and the like, and the computer-readable medium may include multiple memories or data storage media. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor system, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor system may be configured to perform any of the techniques described in this disclosure. A general-purpose processor may be a microprocessor; but in the alternative, the processor may be any conventional processor, controller, microcontroller, or state machine. A processor system may also be implemented as a combination of computing devices, e.g., a combination of a DSP and a microprocessor, a plurality of microprocessors, one or more microprocessors in conjunction with a DSP core, or any other such configuration. Accordingly, the term "processor system," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X. Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A first apparatus for wireless communications, comprising: a memory system; and a processor system coupled to the memory system and configured to: obtain a message for transmission to a second apparatus; determine a time slot of a set of time slots for transmitting the message; determine a symbol of the time slot; determine a number of antenna elements of the first apparatus to disable; transmit a beamformed transmission including a portion of the message for transmission towards the second apparatus; and disable the number of antenna elements during the symbol of the time slot when transmitting the beamformed transmission in a direction other than towards the second apparatus.

Aspect 2. The apparatus of Aspect 1, wherein the symbol includes at least one of data or a demodulation reference signal (DMRS).

Aspect 3. The apparatus of any one of Aspects 1 or 2, wherein the symbol is determined randomly.

Aspect 4. The apparatus of any one of Aspects 1 to 3, wherein the symbol is determined based on a radio frequency capability of the first apparatus.

Aspect 5. The apparatus of any one of Aspects 1 to 4, wherein the time slot is determined based on the message for transmission.

Aspect 6. The apparatus of Aspect 5, wherein the message is transmitted using slot aggregation in at least two aggregated slots, and wherein the time slot is determined based the at least two aggregated slots.

Aspect 7. The apparatus of any one of Aspects 1 to 6, wherein the processor system is further configured to: receive an indication to increase distortion; and determine the number of antenna elements to disable based on the indication to increase distortion.

Aspect 8. The apparatus of Aspect 7, wherein the processor system is further configured to perform a beam refinement process based on the indication to increase distortion.

Aspect 9. The apparatus of any one of Aspects 1 to 8, wherein the processor system is further configured to: transmit, to the second apparatus, an indication to generate a reference signal received power (RSRP) report based on the indication to increase distortion; receive, from the second apparatus, the RSRP report; and determine the number of antenna elements to disable based on the RSRP report.

Aspect 10. The apparatus of any one of Aspects 1 to 9, wherein the processor system is further configured to: receive, from the second apparatus, an indication of a size of a distortion free angular gap; and determine the number of antenna elements to disable based on the indicated size of the distortion free angular gap.

Aspect 11. The apparatus of any one of Aspects 1 to 10, wherein the processor system is further configured to: determine an expected movement of the first apparatus; and determine the number of antenna elements to disable based on the expected movement.

Aspect 12. A method for wireless communications by a first apparatus, comprising: obtaining a message for transmission to a second apparatus; determining a time slot of a set of time slots for transmitting the message; determining a symbol of the time slot; determining a number of antenna elements of the first apparatus to disable; transmitting a beamformed transmission including a portion of the message for transmission towards the second apparatus; and disabling the number of antenna elements during the symbol of the time slot when transmitting the beamformed transmission in a direction other than towards the second apparatus.

Aspect 13. The method of Aspect 12, wherein the symbol includes at least one of data or a demodulation reference signal (DMRS).

Aspect 14. The method of any one of Aspects 12 or 13, wherein the symbol is determined randomly.

Aspect 15. The method of any one of Aspects 12 to 14, wherein the symbol is determined based on a radio frequency capability of the first apparatus.

Aspect 16. The method of any one of Aspects 12 to 15, wherein the time slot is determined based on the message for transmission.

Aspect 17. The method of Aspect 16, wherein the message is transmitted using slot aggregation in at least two aggregated slots, and wherein the time slot is determined based the at least two aggregated slots.

Aspect 18. The method of any one of Aspects 12 to 17, further comprising: receiving an indication to increase distortion; and determining the number of antenna elements to disable based on the indication to increase distortion.

Aspect 19. The method of Aspect 18, further comprising performing a beam refinement process based on the indication to increase distortion.

Aspect 20. The method of any one of Aspects 12 to 19, further comprising: transmitting, to the second apparatus, an indication to generate a reference signal received power (RSRP) report based on the indication to increase distortion; receiving, from the second apparatus, the RSRP report; and determining the number of antenna elements to disable based on the RSRP report.

Aspect 21. The method of any one of Aspects 12 to 20, further comprising: receiving, from the second apparatus, an indication of a size of a distortion free angular gap; and determining the number of antenna elements to disable based on the indicated size of the distortion free angular gap.

Aspect 22. The method of any one of Aspects 12 to 21, further comprising: determining an expected movement of the first apparatus; and determining the number of antenna elements to disable based on the expected movement.

Aspect 23. A non-transitory computer-readable medium having stored thereon instructions that, when executed by a processor system, cause the processor system to: obtain a message for transmission to a second apparatus; determine a time slot of a set of time slots for transmitting the message; determine a symbol of the time slot; determine a number of antenna elements of a first apparatus to disable; transmit a beamformed transmission including a portion of the message for transmission towards the second apparatus; and disable the number of antenna elements during the symbol of the time slot when transmitting the beamformed transmission in a direction other than towards the second apparatus.

Aspect 24. The non-transitory computer-readable medium of Aspect 23, wherein the symbol includes at least one of data or a demodulation reference signal (DMRS).

Aspect 25. The non-transitory computer-readable medium of any one of Aspects 23 or 24, wherein the symbol is determined randomly.

Aspect 26. The non-transitory computer-readable medium of any one of Aspects 23 to 25, wherein the symbol is determined based on a radio frequency capability of the first apparatus.

Aspect 27. The non-transitory computer-readable medium of any one of Aspects 23 to 26, wherein the time slot is determined based on the message for transmission.

Aspect 28. The non-transitory computer-readable medium of Aspect 27, wherein the message is transmitted using slot aggregation in at least two aggregated slots, and wherein the time slot is determined based the at least two aggregated slots.

Aspect 29. The non-transitory computer-readable medium of any one of Aspects 23 to 28, wherein the instructions cause the processor system to: receive an indication to increase distortion; and determine the number of antenna elements to disable based on the indication to increase distortion.

Aspect 30. The non-transitory computer-readable medium of Aspect 29, wherein the instructions cause the processor system to perform a beam refinement process based on the indication to increase distortion.

Aspect 31. The non-transitory computer-readable medium of any one of Aspects 23 to 30, wherein the instructions cause the processor system to: transmit, to the second apparatus, an indication to generate a reference signal received power (RSRP) report based on the indication to increase distortion; receive, from the second apparatus, the RSRP report; and determine the number of antenna elements to disable based on the RSRP report.

Aspect 32. The non-transitory computer-readable medium of any one of Aspects 23 to 31, wherein the instructions cause the processor system to: receive, from the second apparatus, an indication of a size of a distortion free angular gap; and determine the number of antenna elements to disable based on the indicated size of the distortion free angular gap.

Aspect 33. The non-transitory computer-readable medium of any one of Aspects 23 to 32, wherein the instructions cause the processor system to: determine an expected movement of the first apparatus; and determine the number of antenna elements to disable based on the expected movement.

Abstract 34. An apparatus for wireless communications, comprising: means for performing a method according to any of Aspects 12 to 22.

What is claimed is:

1. A first apparatus for wireless communications, comprising:
- a memory system; and
- a processor system coupled to the memory system and configured to:
  - obtain a message for transmission to a second apparatus;
  - receive, from the second apparatus, an indication of a size of a distortion free angular gap;
  - determine a time slot of a set of time slots for transmitting the message;
  - determine a symbol of the time slot;
  - determine a number of antenna elements of the first apparatus to disable based on the indication of the size of the distortion free angular gap;
  - transmit a beamformed transmission including a portion of the message for transmission towards the second apparatus; and
  - disable the number of antenna elements during the symbol of the time slot when transmitting the beamformed transmission in a direction other than towards the second apparatus.

2. The first apparatus of claim 1, wherein the symbol includes at least one of data or a demodulation reference signal (DMRS).

3. The first apparatus of claim 1, wherein the symbol is determined randomly.

4. The first apparatus of claim 1, wherein the symbol is determined based on a radio frequency capability of the first apparatus.

5. The first apparatus of claim 1, wherein the time slot is determined based on the message for transmission.

6. The first apparatus of claim 5, wherein the message is transmitted using slot aggregation in at least two aggregated slots, and wherein the time slot is determined based on the at least two aggregated slots.

7. The first apparatus of claim 1, wherein the processor system is further configured to:
- receive an indication to increase distortion; and
- determine the number of antenna elements to disable based on the indication to increase distortion.

8. The first apparatus of claim 7, wherein the processor system is further configured to perform a beam refinement process based on the indication to increase distortion.

9. The first apparatus of claim 1, wherein the processor system is further configured to:
- transmit, to the second apparatus, an indication to generate a reference signal received power (RSRP) report based on the indication to increase distortion;
- receive, from the second apparatus, the RSRP report; and
- determine the number of antenna elements to disable based on the RSRP report.

10. The first apparatus of claim 1, wherein the processor system is further configured to:
- determine an expected movement of the first apparatus; and
- determine the number of antenna elements to disable based on the expected movement.

11. A method for wireless communications by a first apparatus, comprising:
- obtaining a message for transmission to a second apparatus;
- receiving, from the second apparatus, an indication of a size of a distortion free angular gap;
- determining a time slot of a set of time slots for transmitting the message;
- determining a symbol of the time slot;
- determining a number of antenna elements of the first apparatus to disable based on the indication of the size of the distortion free angular gap;
- transmitting a beamformed transmission including a portion of the message for transmission towards the second apparatus; and disabling the number of antenna elements during the symbol of the time slot when transmitting the beamformed transmission in a direction other than towards the second apparatus.

12. The method of claim 11, wherein the symbol includes at least one of data or a demodulation reference signal (DMRS).

13. The method of claim 11, wherein the symbol is determined randomly.

14. The method of claim 11, wherein the symbol is determined based on a radio frequency capability of the first apparatus.

15. The method of claim 11, wherein the time slot is determined based on the message for transmission.

16. The method of claim 15, wherein the message is transmitted using slot aggregation in at least two aggregated slots, and wherein the time slot is determined based on the at least two aggregated slots.

17. The method of claim 11, further comprising:

receiving an indication to increase distortion; and determining the number of antenna elements to disable based on the indication to increase distortion.

18. The method of claim 17, further comprising performing a beam refinement process based on the indication to increase distortion.

19. The method of claim 11, further comprising:

transmitting, to the second apparatus, an indication to generate a reference signal received power (RSRP) report based on the indication to increase distortion;

receiving, from the second apparatus, the RSRP report; and determining the number of antenna elements to disable based on the RSRP report.

20. The method of claim 11, further comprising:

determining an expected movement of the first apparatus; and determining the number of antenna elements to disable based on the expected movement.

21. A non-transitory computer-readable medium having stored thereon instructions that, when executed by a processor system, cause the processor system to:

obtain a message for transmission to a second apparatus;

receive, from the second apparatus, an indication of a size of a distortion free angular gap;

determine a time slot of a set of time slots for transmitting the message;

determine a symbol of the time slot;

determine a number of antenna elements of a first apparatus to disable based on the indication of the size of the distortion free angular gap;

transmit a beamformed transmission including a portion of the message for transmission towards the second apparatus; and disable the number of antenna elements during the symbol of the time slot when transmitting the beamformed transmission in a direction other than towards the second apparatus.

22. The non-transitory computer-readable medium of claim 21, wherein the symbol includes at least one of data or a demodulation reference signal (DMRS).

23. The non-transitory computer-readable medium of claim 21, wherein the symbol is determined randomly.

24. The non-transitory computer-readable medium of claim 21, wherein the symbol is determined based on a radio frequency capability of the first apparatus.

25. The non-transitory computer-readable medium of claim 21, wherein the time slot is determined based on the message for transmission.

26. The non-transitory computer-readable medium of claim 25, wherein the message is transmitted using slot aggregation in at least two aggregated slots, and wherein the time slot is determined based one the at least two aggregated slots.

27. The non-transitory computer-readable medium of claim 21, wherein the instructions cause the processor system to:

receive an indication to increase distortion; and determine the number of antenna elements to disable based on the indication to increase distortion.

28. The non-transitory computer-readable medium of claim 27, wherein the instructions cause the processor system to perform a beam refinement process based on the indication to increase distortion.

29. The non-transitory computer-readable medium of claim 21, wherein the instructions cause the processor system to:

transmit, to the second apparatus, an indication to generate a reference signal received power (RSRP) report based on the indication to increase distortion;

receive, from the second apparatus, the RSRP report; and determine the number of antenna elements to disable based on the RSRP report.

30. The non-transitory computer-readable medium of claim 21, wherein the instructions cause the processor system to:

determine an expected movement of the first apparatus; and determine the number of antenna elements to disable based on the expected movement.

* * * * *